(12) United States Patent
Steelberg et al.

(10) Patent No.: US 8,541,896 B2
(45) Date of Patent: Sep. 24, 2013

(54) DEEP WATER POWER GENERATION SYSTEM AND APPARATUS

(71) Applicants: Ryan Steelberg, Irvine, CA (US); Chad Steelberg, Newport Beach, CA (US)

(72) Inventors: Ryan Steelberg, Irvine, CA (US); Chad Steelberg, Newport Beach, CA (US)

(73) Assignee: Newport Coast Investments, Irvine, CA (US)

( * ) Notice: Subject to any disclaimer, the term of this patent is extended or adjusted under 35 U.S.C. 154(b) by 0 days.

(21) Appl. No.: 13/765,322

(22) Filed: Feb. 12, 2013

(65) Prior Publication Data

US 2013/0154268 A1 Jun. 20, 2013

Related U.S. Application Data

(63) Continuation of application No. 13/150,560, filed on Jun. 1, 2011, now Pat. No. 8,373,290, which is a continuation of application No. 12/218,238, filed on Jul. 11, 2008, now Pat. No. 7,969,031.

(60) Provisional application No. 60/959,184, filed on Jul. 11, 2007.

(51) Int. Cl.
*F03B 13/10* (2006.01)

(52) U.S. Cl.
USPC .................................................. 290/42; 290/53

(58) Field of Classification Search
None
See application file for complete search history.

(56) References Cited

U.S. PATENT DOCUMENTS

| 4,398,095 | A  | * | 8/1983 | Ono ................................ | 290/53 |
| 6,229,225 | B1 | * | 5/2001 | Carroll .......................... | 290/53 |
| 6,392,314 | B1 | * | 5/2002 | Dick .............................. | 290/53 |
| 7,199,481 | B2 | * | 4/2007 | Hirsch ........................... | 290/42 |
| 7,323,790 | B2 | * | 1/2008 | Taylor et al. ................... | 290/42 |

* cited by examiner

*Primary Examiner* — Michael Zarroli
(74) *Attorney, Agent, or Firm* — Barnes & Thornburg LLP; Thomas J. McWilliams; Edward F. Behm, Jr.

(57) ABSTRACT

A system for generation of power using an apparatus in deep water is disclosed. The system includes a ballast buoy configured to achieve a desired depth in the deep water, a substantially vertical hollow tube attached to the ballast buoy that is submerged under water when the ballast buoy achieves the desired depth in the deep water, and a converter for converting the physical environment created in the substantially vertical hollow tube by placement of the ballast buoy at the desired depth in the deep water.

6 Claims, 4 Drawing Sheets

DEEP WATER POWER GENERATION SYSTEM AND APPARATUS

CROSS-REFERENCE TO RELATED APPLICATION

This application is a continuation of U.S. patent application Ser. No. 13/150,560, entitled DEEP WATER POWER GENERATION SYSTEM AND APPARATUS, filed Jun. 1, 2011 now U.S. Pat. No. 8,373,290, which is a continuation of U.S. patent application Ser. No. 12/218,238, entitled DEEP WATER POWER GENERATION SYSTEM AND APPARATUS, filed Jul. 11, 2008 now U.S. Pat. No. 7,969,031, which application claims priority to U.S. patent application Ser. No. 60/959,184, entitled DEEP WATER POWER GENERATION SYSTEM AND APPARATUS, filed Jul. 11, 2007; the entire disclosures of which are incorporated herein as if set forth in their entirety.

FIELD OF THE INVENTION

The present invention is directed generally to a system and apparatus for power generation and, more particularly, to a deep water power generation system and apparatus.

BACKGROUND OF THE INVENTION

Generating a sufficient energy supply to run the world's ever increasingly energy hungry operation has become a goal on which many modern scientists are intensely focused. One suggested methodology by which such energy supplies could be generated in an environmentally friendly manner has consisted of the generation of power using the water power of the world's oceans. Numerous types of such energy harnessing power generators for operation with the world's oceans have been suggested. Such a sustainable alternative energy source is increasingly attractive as the cost of oil rises and the negative effects on the world's environment of traditional energy supply systems become more apparent.

Much of the focus on power generation from the world's oceans has been on "wave "energy." One design takes the wave into a funnel at the point of the shore and drives air pressure past two turbines, from which energy is supplied. It has been estimated that this method may enable the turning of a 250 kilowatt generator. A second method provides for a series of layered reservoirs following a carefully calculated slope. Essentially, such reservoirs discretize the potential energy of wave input. The energy entering each reservoir is converted to kinetic energy by falling down through the reservoir system, and its energy in turn, turns a generator. It is estimated that the operation of such a system using breakwater may generate 150 kilowatts of generator capacity. Yet another method places buoys on the system of the ocean and allows the up and down power inherent in waves (as water attempts to reach the point of lowest pressure) to turn an electric generator. Such "wave power" systems have been estimated to enable the supply of ten megawatts of power occupying only four acres of ocean space. As such, the generation of a hundred megawatts of power would occupy just 40 acres of ocean space, and would supply environmentally friendly power at a rate cheaper than fossil fuels.

And yet another alternative methodology, a large buoy system employs a series of large semi-submerged buoy sections, into which the waves strike and cause bending between the sections. This bending action moves a hydraulic piston, which pushes fluid in a linear flow that produces energy. It has been estimated that such a large buoy system occupying one square kilometer could produce 30 megawatts of power.

However, none of the aforementioned programs supply adequate energy at modern standards to enable their widespread use. Further, certain programs, such as the deep ocean pipe, might require the creation of technologies not yet available to enable their use.

SUMMARY OF THE INVENTION

The present invention is directed generally to a system and apparatus for power generation and, more particularly, to a deep water power generation system and apparatus.

The present invention solves problems experienced with the prior art because it provides for the clean and consistent generation of power. Those and other advantages and benefits of the present invention will become apparent from the detailed description of the invention hereinbelow.

A system for generation of power using an apparatus in deep water is disclosed. The system includes a ballast buoy configured to achieve a desired depth in the deep water, a substantially vertical hollow tube attached to the ballast buoy that is submerged under water when the ballast buoy achieves the desired depth in the deep water, and a converter for converting the physical environment created in the substantially vertical hollow tube by placement of the ballast buoy at the desired depth in the deep water.

BRIEF DESCRIPTION OF THE FIGURES

Understanding of the present invention will be facilitated by consideration of the following detailed description of the preferred embodiments of the present invention taken in conjunction with the accompanying drawings, in which like numerals refer to like parts.

DETAILED DESCRIPTION OF THE PREFERRED EMBODIMENTS

It is to be understood that the figures and descriptions of the present invention have been simplified to illustrate elements that are relevant for a clear understanding of the present invention, while eliminating, for purposes of clarity, many other elements found in typical hydrologic power generation systems. Those of ordinary skill in the art will recognize that other elements are desirable and/or required in order to implement the present invention. However, because such elements are well known in the art, and because they do not facilitate a better understanding of the present invention, a discussion of such elements is not provided herein.

The present invention takes advantage of not only the natural up and down motion of water, but additionally takes advantage of deep ocean water pressure, and does so in a manner that has a lower environmental and social impact than current methods. More specifically, the present invention has no need to place funnels, slopes, buoys, or large pipes at the surface of the water, and as such constitutes an improved social and an environmental system over the prior art. Further, the present invention allows the reuse of, for example, offshore oil rigs that are no longer in use, but allows for such re-use without significant modification to those technologies, such as those modifications which would be required by the deep ocean pipe mechanism.

Figure 1:
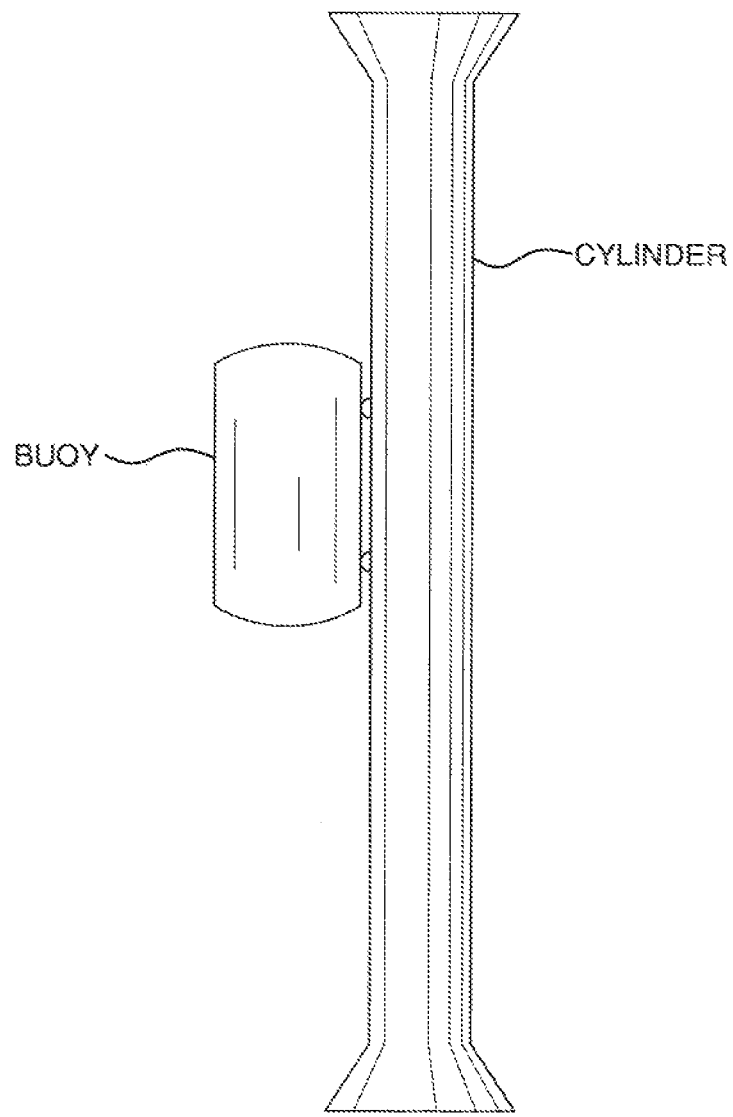
FIG. 1 is an embodiment of the power system and apparatus.

More specifically, as illustrated in FIG. 1, the present invention takes advantage of ballast principles to "sink" a power generating buoy to a depth sufficient to take advantage of the increased pressure at deeper ocean levels. It will be apparent to those of ordinary skill in the pertinent art that such a ballast buoy, and the turbine which is turned by the water flow, will be such that their use will be enabled in deep ocean waters, without the formation of fissures or excessive corrosion. Corrosive effects may be minimized, in part, by the depth to which the ballast buoy is sunk, at least in that excessive temperature variations of the water are minimized at deeper ocean levels, and further due to the fact that salt content is minimal or non-existent at deeper ocean levels.

Figure 2:
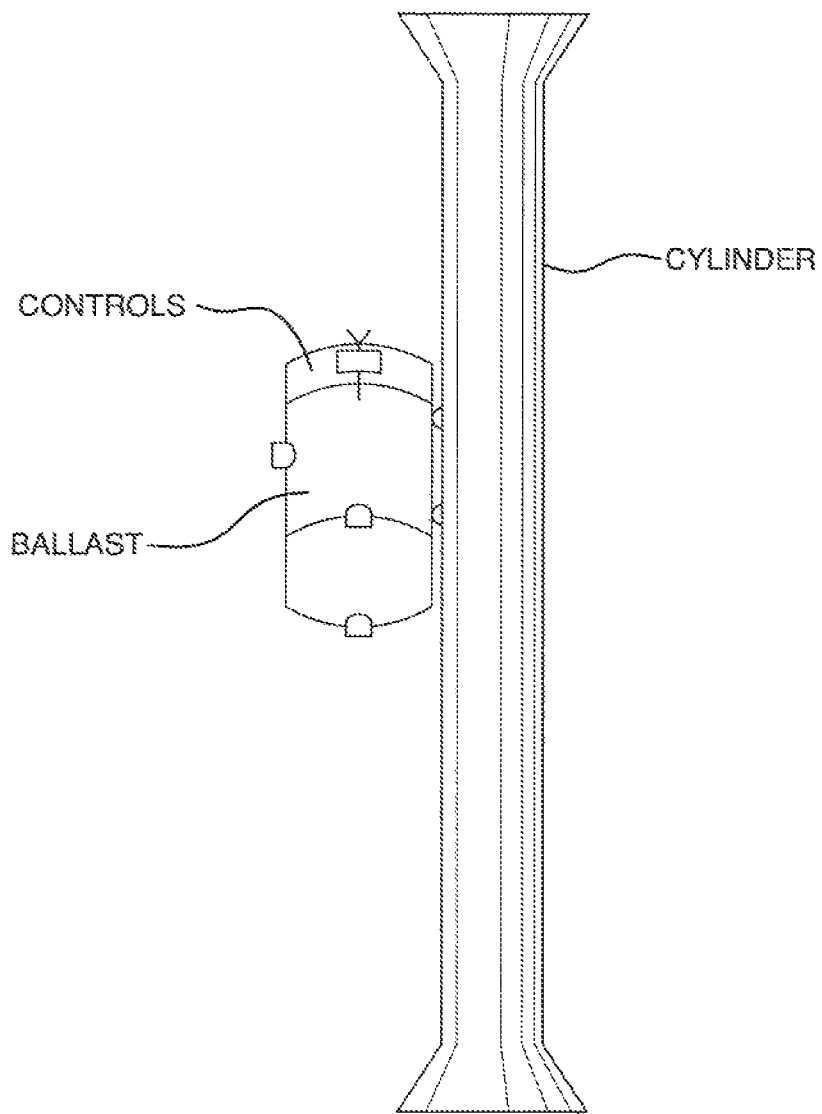
FIG. 2 is a schematic diagram of the ballast buoy system.

FIG. 2 is a schematic diagram illustrating the ballast buoy of FIG. 1. As is shown, the buoy may include one or more depth sensors, and may additionally include one or more ballast compartments, wherein, as will be apparent to those skilled in the art, water may be allowed until the depth sensor assesses that the ballast buoy has reached the desired depth level. As will be apparent to those skilled in the art, the depth sensors may be physically associated with the ballast buoy and may correspondingly automatically sense and achieve the proper depth level, or the depth sensors may merely constitute, for example, one or more pressure transducers, which may relay depth readings, with a mathematical equivalent thereof, to the surface, and entities on the surface may control the entry of water into the ballast to obtain desired depth levels.

Figure 3:
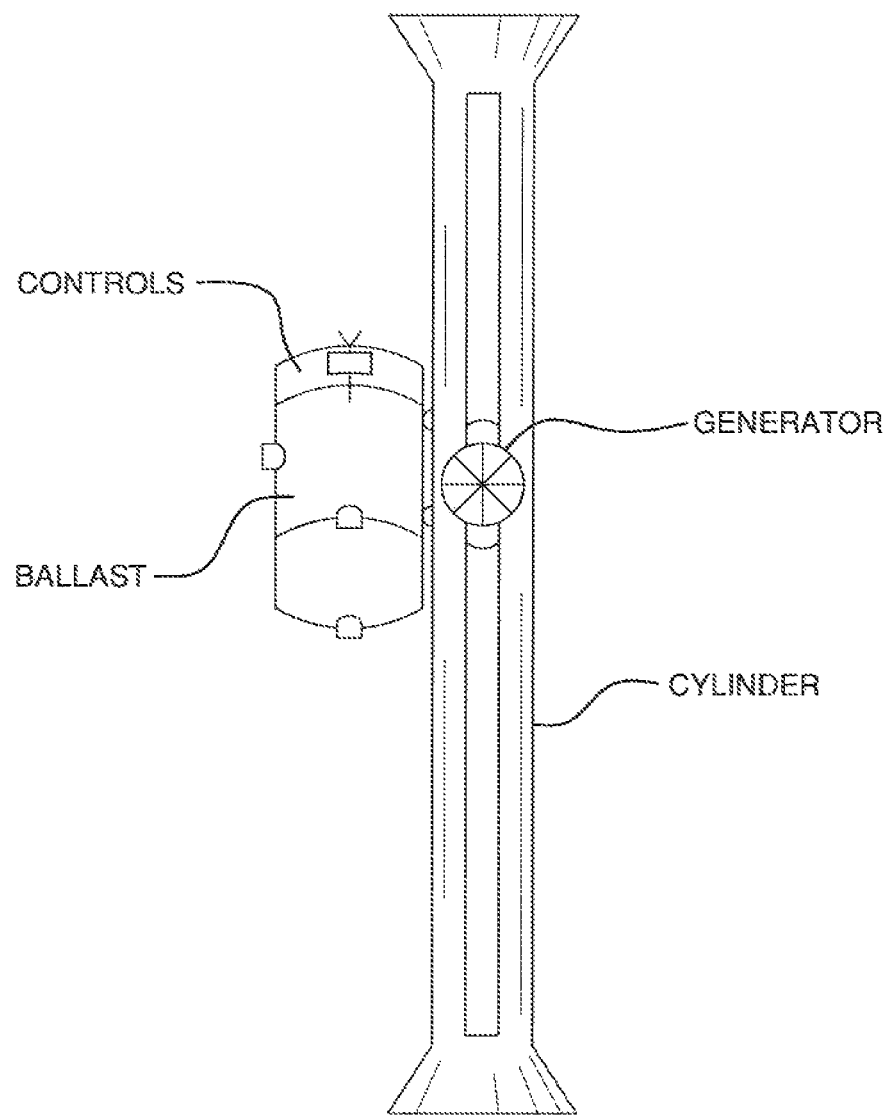
FIG. 3 is an embodiment of the power system and apparatus.

The ballast buoy, as illustrated in FIG. 3, may have mounted thereunder or there alongside a vertical, hollow cylinder. The cylinder may preferably be mounted in a sufficiently rigid manner such that the intense pressure of deep ocean waters will not bend or break the cylinder. The passing of ocean water upward (i.e., from points of higher pressure in deeper water to points of lower pressure at more shallow water) may then generate kinetic energy through any method known to those skilled in the art, such as by forcing the movement of a drive piston. Such a piston may, for example, remain at equilibrium between two pumps attached at opposed sides of the piston and respectively extending to the top and the bottom of the aforementioned cylinder. Such a pump may be a simplistic pump, such as a hose that has a reduced internal volume when the hose is stretched, and an increased internal volume when the hose is relaxed, thereby acting as a pump. Once pumped, the pressurized water may be expelled into an accumulator that feeds a turbine. The turbine may, in turn, drive a generator, and the generated electricity may be brought to the surface by a cabling known to those skilled in the art, such as standard submarine cabling.

Figure 4:
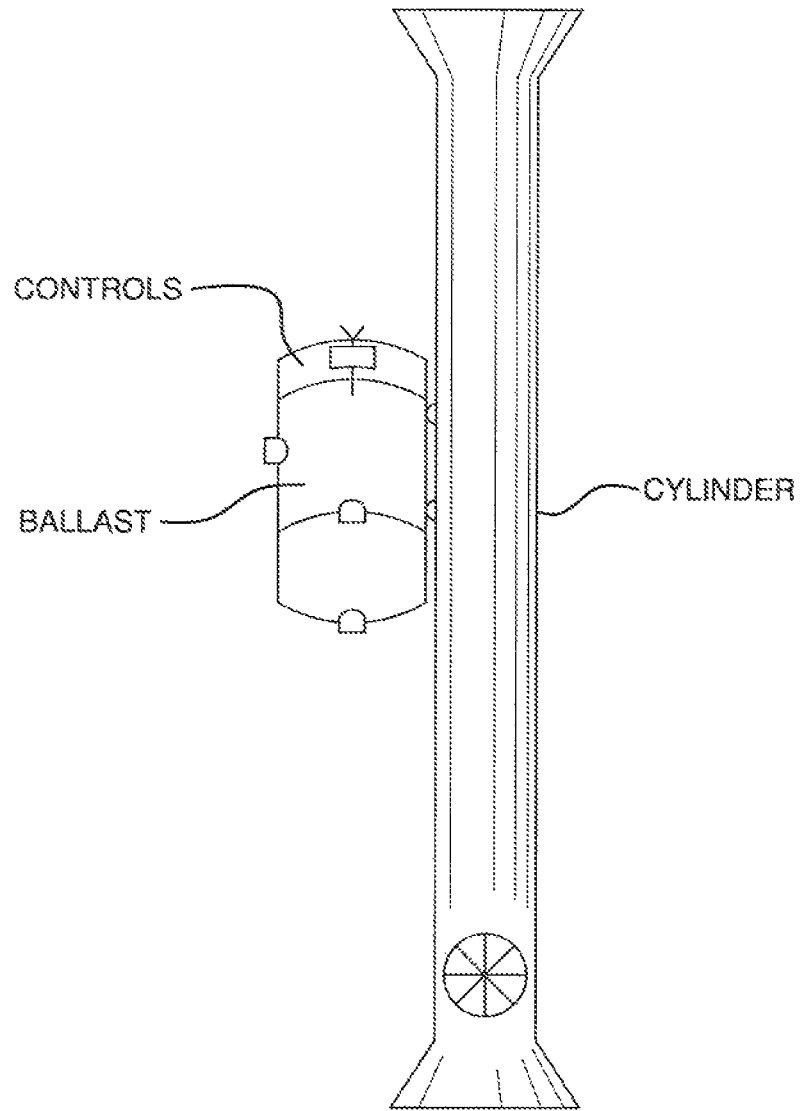
FIG. 4 is an embodiment of the power system and apparatus.

As further illustrated in FIG. 4, the power generation system and apparatus may take advantage of pressure head differences between the vertical ends of the cylinder. By way of non-limiting example only, a cylinder having a length of 30 meters may be lowered and maintained at a deep water depth of 30 meters providing a first pressure head of $7.07 \times 10^5$ N/m$^2$ and a second pressure head of $4.04 \times 10^5$ N/m$^2$. By way of further non-limiting example only, a cylinder having a length of 40 meters may be lowered and maintained at a deep water depth of 60 meters providing a first pressure head of $11.09 \times 10^5$ N/m$^2$ and a second pressure head of $7.07 \times 10^5$ N/m$^2$.

Known methodologies that employ similar pump and pressurized seawater systems operate using water that is at significantly lower pressure than deep ocean water. Consequently, the deep ocean water of the present invention, and more precisely the pressure under which such deeper ocean water is, will allow for significant multiples of power to be generated by the present invention over those power generations made available in the prior art.

Further, the present invention lends itself to a multiple buoy system, wherein a buoy at or near the surface supports the ballast buoy at a lower level thereby reducing the need for the ballast buoy to maintain a precise proper depth. Further, one or more such buoys above the ballast buoy may be present, and such buoys may be used to generate additional power, operate to hold the aforementioned cabling, or the like. Additionally, the present invention, either using a single ballast buoy or a multiple buoy system, may lend itself to the packatization of power supply. More specifically, to overcome the inconvenience of obtaining the electrical power generated in deep ocean water, the electricity generated may be brought to the surface in stages, or "packets" wherein such packets are stored until a sufficient amount of power is accumulated to merit bringing that power to the surface. Such storage may occur, for example, using capacitors, inductors, or other storage or energy generation mechanisms. Additionally, the operation of the present invention is simplified by the non-continuous generation of the power from deep ocean water level.

An additional alternative system would harness the intense pressure resident in deep ocean waters via a pipe dropped from the surface of the ocean water down to those deep depths. The intense pressure would then drive the water up the pipe, and the water would drive a turbine on the surface based on the water flowing up the pipe.

The disclosure herein is directed to the variations and modifications of the elements and methods of the invention disclosed that will be apparent to those skilled in the art in light of the disclosure herein. Thus, it is intended that the present invention covers the modifications and variations of this invention, provided those modifications and variations come within the scope of the appended claims and the equivalents thereof.

What is claimed is:

1. A system for generation of power using an apparatus in deep water, said system comprising:
   a buoy configured to achieve a desired depth in the deep water;
   a substantially vertical hollow tube attached to said buoy that is submerged under water when said buoy achieves the desired depth in the deep water; and a generator configured to generate electricity based on the pressure head differences in the physical environment created in between the vertical ends of said substantially vertical hollow tube at said desired depth in the deep water to energy;
   wherein the hollow tube is submerged below the direct influence of surface wave action of the water.

2. The system of claim 1, wherein placement of said buoy at the desired depth in deep water occurs at a depth sufficient to make use of the increased pressure at deeper ocean levels.

3. The system of claim 1, wherein placement of said buoy at the desired depth in deep water minimizes corrosion of the system to make use of minimal temperature variations at deeper ocean levels.

4. The system of claim 1, wherein placement of said buoy at the desired depth in deep water minimizes corrosion of the system to make use of decreased salinity at deeper ocean levels.

5. The system of claim 1, wherein said substantially vertical hollow tube is a cylinder.

6. The system of claim 1, wherein said substantially vertical hollow tube is coupled to said buoy in a rigid manner.

* * * * *